(12) United States Patent
Peigne

(10) Patent No.: US 9,156,116 B2
(45) Date of Patent: Oct. 13, 2015

(54) AXIAL MACHINING DEVICE

(75) Inventor: Gregoire Peigne, Bouguenais (FR)

(73) Assignee: MITIS, Bouguenais (FR)

( * ) Notice: Subject to any disclaimer, the term of this patent is extended or adjusted under 35 U.S.C. 154(b) by 713 days.

(21) Appl. No.: 13/509,690

(22) PCT Filed: Nov. 16, 2010

(86) PCT No.: PCT/IB2010/055191
§ 371 (c)(1),
(2), (4) Date: Oct. 29, 2012

(87) PCT Pub. No.: WO2011/061678
PCT Pub. Date: May 26, 2011

(65) Prior Publication Data
US 2013/0051946 A1 Feb. 28, 2013

(30) Foreign Application Priority Data
Nov. 17, 2009 (FR) ..................................... 09 58081

(51) Int. Cl.
*B23B 47/34* (2006.01)
*B23Q 5/32* (2006.01)

(52) U.S. Cl.
CPC ............... *B23Q 5/326* (2013.01); *B23B 47/34* (2013.01); *B23Q 5/32* (2013.01); *B23Q 5/323* (2013.01); *Y10T 408/03* (2015.01); *Y10T 408/23* (2015.01); *Y10T 408/6771* (2015.01); *Y10T 408/6793* (2015.01); *Y10T 408/68* (2015.01)

(58) Field of Classification Search
CPC .......... B23B 47/34; B23Q 5/32; B23Q 5/326; Y10T 408/23; Y10T 408/6771; Y10T 408/6793; Y10T 408/68
USPC ..................................... 408/17, 132, 137, 138
See application file for complete search history.

(56) References Cited

U.S. PATENT DOCUMENTS 2,791,922 A * 5/1957 Robinson ........................ 173/19
3,141,509 A * 7/1964 Bent .............................. 173/19
(Continued)

FOREIGN PATENT DOCUMENTS

DE 102005002462 A1 7/2006
EP 1500780 A1 1/2005
(Continued)

OTHER PUBLICATIONS

International Search Report dated Oct. 21, 2011.
(Continued)

*Primary Examiner* — Eric A Gates
(74) *Attorney, Agent, or Firm* — Pearne & Gordon LLP

(57) ABSTRACT

The present invention provides an axial machining device comprising a tool-carrier spindle rotatable in a housing, the housing housing a transmission system causing the spindle to advance automatically relative to the housing under the effect of the tool-carrier spindle being driven in rotation, the transmission system including an advance gearwheel screwed onto the spindle, the device including a resilient return member urging the advance gearwheel in a first axial direction opposite to the advance direction of the spindle, and also including a first rolling bearing having rolling members rolling on an undulating raceway having an axial component, thereby periodically urging the advance gearwheel to move in a second direction opposite to the first, such that rotation of the spindle is accompanied by axial vibratory motion.

13 Claims, 6 Drawing Sheets

(56) References Cited

U.S. PATENT DOCUMENTS

| | | | |
|---|---|---|---|
| 3,512,433 A * | 5/1970 | Juhasz et al. | 408/30 |
| 3,577,807 A * | 5/1971 | Alexander et al. | 408/17 |
| 3,583,822 A * | 6/1971 | Alexander et al. | 408/11 |
| 4,362,444 A * | 12/1982 | Watkins | 408/17 |
| 4,421,441 A * | 12/1983 | Hirose | 408/17 |
| 4,473,329 A * | 9/1984 | Aoshima et al. | 408/11 |
| 4,507,030 A * | 3/1985 | Jackson | 409/185 |
| 4,770,569 A * | 9/1988 | Ooki et al. | 408/17 |
| 4,793,746 A * | 12/1988 | Ooki et al. | 408/17 |
| 5,054,968 A * | 10/1991 | Eckman | 408/97 |
| 5,073,068 A * | 12/1991 | Jinkins et al. | 408/17 |
| 5,533,842 A * | 7/1996 | Johnson et al. | 408/17 |
| 7,510,024 B2 | 3/2009 | Veres | |
| 8,257,002 B2 * | 9/2012 | Prust et al. | 409/132 |
| 8,277,154 B2 * | 10/2012 | Brown et al. | 408/1 R |
| 8,469,641 B2 * | 6/2013 | Jaillon | 408/17 |
| 8,721,232 B2 * | 5/2014 | Peigne | 408/17 |
| 2007/0209813 A1 | 9/2007 | Veres | |
| 2014/0169895 A1 * | 6/2014 | Luebbering | 408/17 |

FOREIGN PATENT DOCUMENTS

| | | | |
|---|---|---|---|
| FR | 2881366 | | 8/2006 |
| FR | 2907695 | | 5/2008 |
| FR | 2907695 A1 | | 5/2008 |
| GB | 710543 A * | | 6/1954 |
| GB | 1451557 A * | | 10/1976 |
| JP | 200880432 | | 4/2008 |
| WO | 2008000935 | | 1/2008 |
| WO | WO 2008000935 A1 * | 1/2008 | B23B 29/12 |

OTHER PUBLICATIONS

Chinese office action dated Sep. 28, 2014 for CN2010800520010.
Japanese office action dated Aug. 27, 2014 for JP 2012-539455.

* cited by examiner

AXIAL MACHINING DEVICE

FIELD OF THE INVENTION

The present invention relates to devices for axial machining, such as drilling, boring, and milling, and more particularly it relates to compact devices incorporating means for imparting advance and infeed movement to the tool, e.g. a drill bit.

BACKGROUND OF THE INVENTION

Patent application FR 2 881 366 in the name of SETI TEC describes a drilling device including a drive gearwheel for driving a bit-carrier spindle in rotation and an advance gearwheel connected to the bit-carrier spindle via a threaded connection.

A similar device is shown in FIG. 1. In this figure the numerical references are the same as those used below for referring to component parts that are identical or similar.

Vibratory drilling devices are also known from the following publications: WO 2008/000935 A1, DE 10 2005 002 462 B4, U.S. Pat. No. 7,510,024 B2, FR 2 907 695, and US 2007/209813.

Vibratory assistance serves to break up swarf and to increase the quality of drilled holes by eliminating the risk of clogging, to increase the lifetime of tools, and to make the method more reliable.

In publications FR 2 907 695, U.S. Pat. No. 7,510,024, and US 2007/209813, the oscillations are generated by cams without rolling members. That gives rise to friction on the cams, thereby generating heat and noise. In addition, the optimum vibratory frequency for good fragmentation of swarf is not always obtained because the frequency is an integer multiple of the speed of rotation differential between the advance gearwheel and either the spindle or the housing, which differential is directly related to the number of oscillations of the cam.

In patent DE 10 2005/002462, a spring exerts a return force on a rolling bearing that includes a raceway that is undulating in the advance direction of the drill bit for the purpose of producing axial vibration. In the event of high axial pressure on the drill bit, the rolling members can cease to roll on the undulating raceway and the bit can cease to oscillate. In order to avoid that drawback, the spring must be very stiff, which can lead to the bearing being overdimensioned. That gives rise to increased costs and size.

Furthermore, the device is fitted to the end of the spindle, under the advance system, thereby adding to overall size and leading to greater complexity.

There exists a need to further improve drilling devices, in particular those for machining aviation workpieces of large dimensions, such as for example fuselage or wing parts.

OBJECT AND SUMMARY OF THE INVENTION

The invention thus provides an axial machining device comprising a tool-carrier spindle rotatable in a housing, the housing housing a transmission system for causing the spindle to advance automatically relative to the housing under the effect of the tool-carrier spindle being driven in rotation, the transmission system including an advance gearwheel screwed onto the spindle.

The device comprises a resilient return member urging the advance gearwheel in a first axial direction preferably opposite to the advance direction of the spindle (i.e. its direction of movement during machining). The device includes a first rolling bearing having rolling members rolling on an undulating raceway having an undulation axial component, thereby periodically urging the advance gearwheel to move in a second direction opposite to the first, such that rotation of the spindle is accompanied by axial vibratory motion.

The device of the invention is compact because the means for creating the vibratory motion are integrated inside the housing. Friction is also greatly reduced because of the rolling members.

Furthermore, the invention makes it possible to generate axial vibration at a frequency that is associated with the speed of rotation of the rotary gearwheel, thus enabling the number of oscillations per revolution to be kept constant independently of the advance settings. In a variant of the invention, in which the first bearing bears directly against the advance gearwheel and in which the axial vibration frequency is then directly associated with the speed of the rotation of the rotary gearwheel and not with the speed of rotation of the tool-carrier spindle, this particular advantage is lost, but other advantages remain.

It is advantageous for the return member to urge the advance gearwheel in a direction opposite to the advance direction of the spindle. This makes it possible to use the first rolling bearing to exert an axial force in the advance direction of the spindle. Thus, even if the drill bit is overloaded axially, it continues to be subjected to vibratory motion. Furthermore, neither the return member nor the first rolling bearing needs to be overdimensioned. The device thus remains easy to integrate in a housing containing the spindle transmission and advance system.

The first rolling bearing advantageously has rollers, since rollers are capable of withstanding greater forces than balls.

The undulating raceway co-operates with the rolling members like epicyclic gearing acting as step-down gearing and decreasing the number of oscillations per revolution. The first bearing thus serves both to reduce friction and to reduce the vibratory motion by the epicyclic gearing.

The undulating raceway may be configured to produce a number of vibratory periods per revolution of the tool-carrier spindle that is not an integer, or that is even an irrational number. The number of vibratory periods per revolution of the tool-carrier spindle may for example lie between 1 and 3 (excluding the end values) and may in particular be equal to about 1.5 or 2.5. The undulating raceway may have an odd number of undulations, e.g. sinusoidal undulations per revolution. For example three undulations on the undulating raceway may generate about 1½ oscillations per revolution of the spindle, given the rotation of the rolling members. A non-integer number makes it possible to avoid the cutting edges following parallel paths during drilling, and thereby increases the effectiveness with which swarf is fragmented.

The undulating raceway preferably produces a non-integer and irrational number of vibratory periods per revolution of the tool-carrier spindle.

The first rolling bearing may have a flat ring and an undulating ring with the rolling members rotating between them, these rings being stationary or movable within the device. The undulating ring defines the undulating raceway.

The number of rolling members between the flat ring and the undulating ring is equal to the number of undulations in the undulating ring.

Because one of the rings is undulating, the path followed by the rolling members of the ring is not a two-dimensional (2D) circle but rather a three-dimensional (3D) sinewave. Thus, the lengths of the paths on a flat ring and on an undulating ring are different, even if the diameters of the rings are equal.

Willis' formula may be applied to the invention. The path of the current point on the undulating ring may thus be written:

$$\overrightarrow{OM} = R1 \cdot \vec{er} + \frac{A}{2} \cdot \sin(N \cdot \theta) \cdot \vec{ez}$$

where R1 is the radius of the path on the ring, $\theta$ is the angle formed by the current point, N is the number of undulations, and A is their amplitude.

On differentiating this equation, the following equation is obtained:

$$d\overrightarrow{OM} = 0 \cdot \vec{er} + R1 \cdot d\theta \cdot \vec{e\theta} - \frac{A}{2} \cdot N \cdot \cos(N \cdot \theta) \cdot d\theta \cdot \vec{ez}$$

The absolute value or "norm" of this equation serves to obtain the derivative of the curvilinear abscissa axis, i.e. the length of the path $s_1$ of the undulating ring:

$$ds_1 = \sqrt{\left[R1^2 + \left(\frac{A}{2} \cdot N \cdot \cos(N \cdot \theta)\right)^2\right]} \, d\theta$$

Integrating the above equation serves to calculate the curvilinear abscissa $s_1$:

$$s_1 = \int_0^{2\pi} \sqrt{\left[R1^2 + \left(\frac{A}{2} \cdot N \cdot \cos(N \cdot \theta)\right)^2\right]} \, d\theta =$$

$$\int_0^{2\pi \cdot N} \sqrt{\left[\left(\frac{R1}{N}\right)^2 + \left(\frac{A}{2} \cdot \cos\varphi\right)^2\right]} \, d\varphi$$

$$s_1 = \sqrt{\left(\frac{R1}{N}\right)^2 + \left(\frac{A}{2}\right)^2} \cdot \int_0^{2\pi \cdot N} \sqrt{1 - \left[\frac{\frac{A}{2} \cdot \sin\varphi}{\sqrt{\left(\frac{R1}{N}\right)^2 + \left(\frac{A}{2}\right)^2}}\right]^2} \, d\varphi$$

$$s_1 = \sqrt{\left(\frac{R1}{N}\right)^2 + \left(\frac{A}{2}\right)^2} \cdot E\left(2\pi \cdot N, \frac{\frac{A}{2}}{\sqrt{\left(\frac{R1}{N}\right)^2 + \left(\frac{A}{2}\right)^2}}\right)$$

where the above integral is the incomplete elliptical integral of the second kind.

On the flat ring, the length of the path $s_2$ may be written merely as the perimeter of a circle:

$$s_2 = \int_0^{2\pi} R2 \cdot d\theta = 2\pi \cdot R2$$

where R2 is the radius of the ring.

The reduction ratios $r_1$ and $r_2$ of the epicyclic gearing relative respectively to the moving ring or to the stationary ring may be written as follows:

$$r_1 = \frac{s_1}{s_1 + s_2}; \; r_2 = \frac{s_2}{s_1 + s_2}$$

This calculation involves numerous parameters and by its nature it gives rise to a number of oscillations per revolution that is irrational, as explained in the examples below.

By taking the radii to be equal for the flat and undulating rings, i.e. R1=R2=20 millimeters (mm), N=3 for the number of undulations, and A=0.5 mm for their amplitude, the reduction ratios of the epicyclic gearing are approximately equal to $r_1$=0.500351 and $r_2$=0.499649, thereby giving 1.50105 vibratory periods per revolution of the spindle if the undulating ring is stationary and 1.49895 vibratory periods per revolution of the spindle if the flat ring is stationary.

Using radii of different values, i.e. R1=22 mm and R2=20 mm, and A=0.1 mm with the same number of undulations, the reduction ratios of the epicyclic gearing are approximately equal to $r_1$=0.523821 and $r_2$=0.476179, giving 1.57146 vibratory periods per revolution of the spindle for a stationary undulating ring and 1.42854 vibratory periods per revolution of the spindle for a stationary flat ring.

An irrational number of oscillations per revolution of the spindle makes it possible to avoid any risk of self-sustaining vibration or chatter.

It is particularly advantageous to have a non-integer and irrational number of oscillations per revolution, in particular when using the device to perform countersinking and counterboring operations. An irrational number of oscillations per revolution makes it possible to avoid a shape defect at the end of the operation, in particular when there is an end-of-stroke timeout after a few seconds, during which period there is no advance. If the advance is stopped at the end of the stroke for a defined number of revolutions then, when using a non-integer and irrational number of oscillations per revolution, the resulting surface, which may be conical or plane for example, is not subjected to any localized oscillation in permanent manner at any one location, so a shape defect, if any, is acceptable. The peak of each oscillation is angularly offset a little relative to the preceding oscillation.

The transmission system may include a rotary gearwheel serving to drive the tool-carrier spindle in rotation and arranged in the housing with the possibility of moving axially relative to the housing. The first rolling bearing may bear directly against the rotary gearwheel.

The rotary gearwheel may be situated between the advance gearwheel and the first rolling bearing, however, in a variant, the advance gearwheel may be situated between the rotary gearwheel and the first rolling bearing.

The device may have a second rolling bearing interposed between the advance gearwheel and the rotary gearwheel.

The advance gearwheel may rotate within a third rolling bearing, in particular a needle bearing. A needle bearing makes it easier to accommodate the axial movement of the advance gearwheel than does a ball bearing.

The resilient return member may comprise a spring washer with the tool-carrier spindle passing therethrough. The spring washer may rest against a radially inner ring of a fourth rolling bearing through which the tool-carrier spindle passes, e.g. a rolling bearing having two rows of balls, thereby enabling the accuracy of guidance to be increased.

The invention also provides a method of axial machining in which use is made of a device as defined above.

BRIEF DESCRIPTION OF THE DRAWINGS

The invention can be better understood on reading the following detailed description of non-limiting embodiments of the invention and on examining the accompanying drawings, in which.

MORE DETAILED DESCRIPTION

Figure 1:
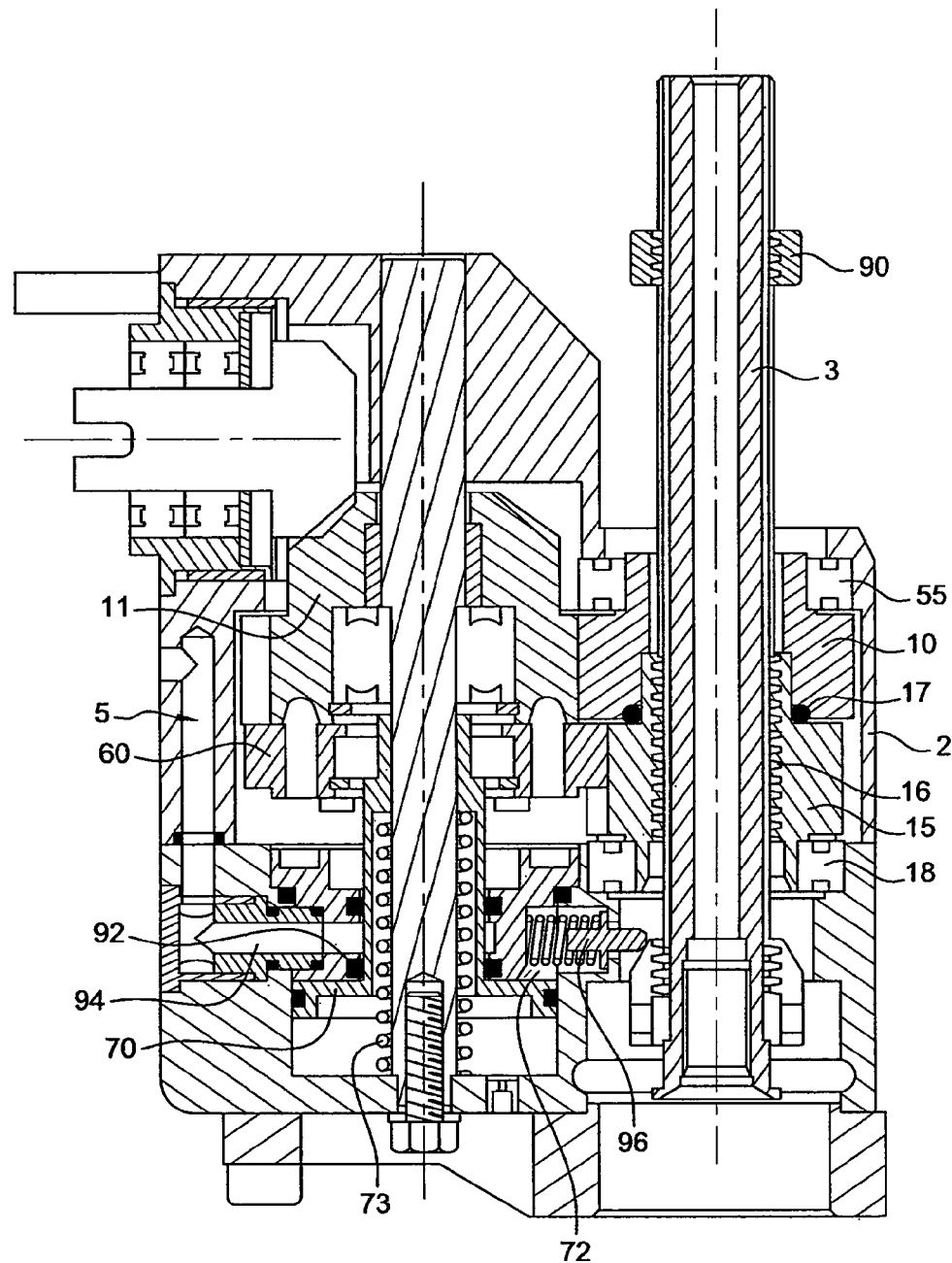
FIG. 1 is a longitudinal section view of an example of a prior art device.
Figure 2:
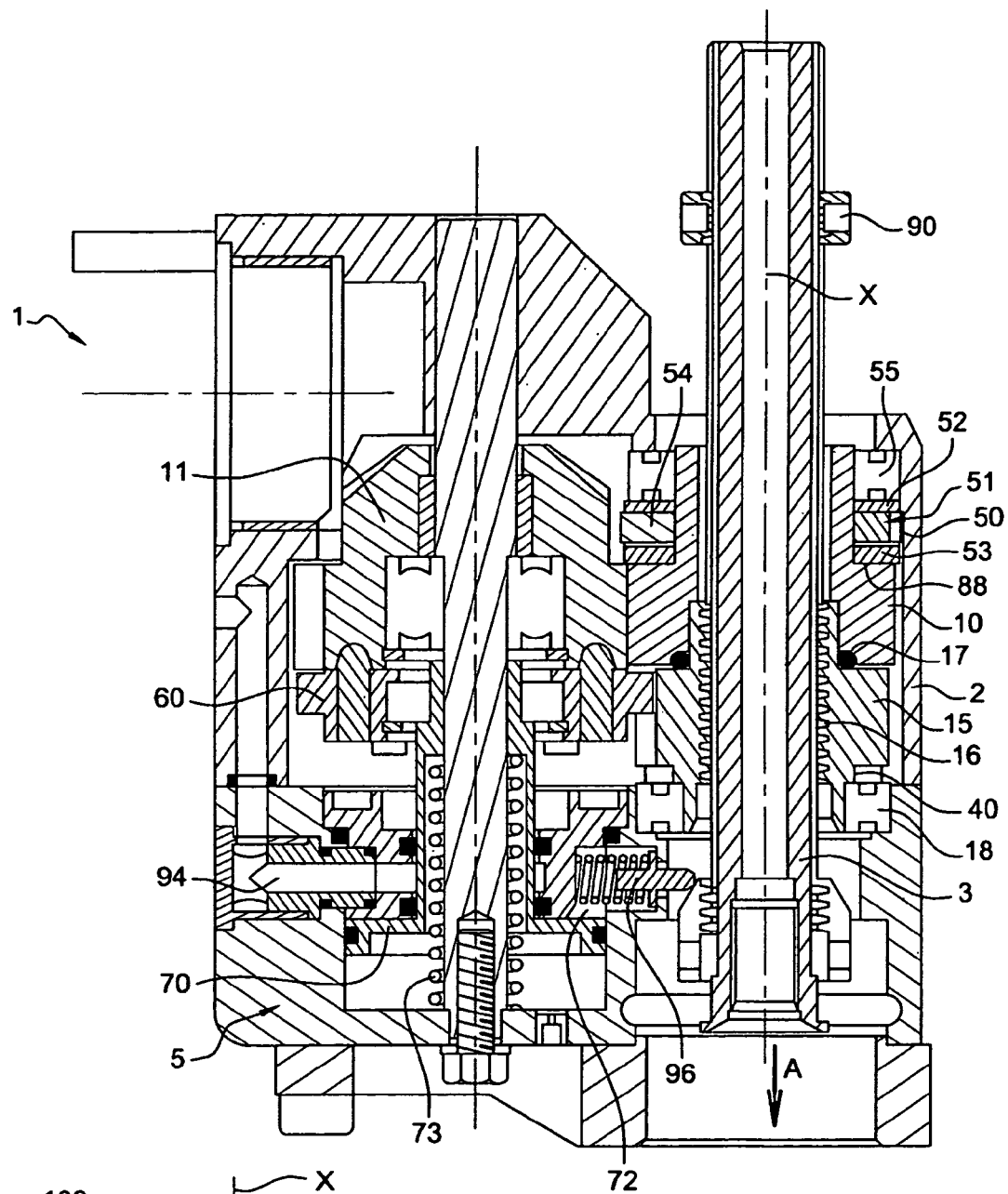
FIG. 2 is a view similar to FIG. 1 showing an example of a drilling device made in accordance with the invention.

The machining device 1 in accordance with the invention that is shown in FIG. 2, in particular a drilling device, comprises a housing 2 that houses part of a tool-carrier spindle 3, and a system 5 for automatically driving and advancing the spindle 3. The system 5 is coupled to a drive motor 112 shown in FIGS. 5 to 7, which motor may be a pneumatic motor, for example. The spindle 3 drives a drill bit or a cutter (not shown) so as to perform axial machining, e.g. drilling.

By way of example, the system 5 is similar to that described in patent application FR 2 881 366, and it comprises a rotary gearwheel 10 that rotates with the spindle 3 while allowing it to move axially relative thereto, the connection between the rotary gearwheel 10 and the spindle 3 being a sliding connection, for example, the spindle 3 possibly having fluting in which corresponding splines of the rotary gearwheel 10 are engaged.

The rotary gearwheel 10 is driven in rotation about an axis X by a drive wheel 11 coupled to the motor.

The system 5 also has an advance gearwheel 15 that is movable axially inside the housing 2 along the axis X and that includes a thread 16 screwed onto a threaded portion of the spindle 3, such that turning the advance gearwheel 15 relative to the spindle 3 causes the spindle to move axially. By way of example, the spindle may advance by about 0.1 mm approximately for one revolution of the spindle. The speed of rotation of the spindle may for example lie in the range 300 revolutions per minute (rpm) to 5000 rpm.

The advance gearwheel 15 can rotate relative to the rotation gearwheel 10, a rolling bearing 17 having rolling members such as balls being interposed axially between them, as shown.

The advance gearwheel 15 can rotate within a bottom guide rolling bearing 18 that serves to guide it in rotation while allowing the advance gearwheel 15 to have a certain upward axial stroke relative to the housing 2.

A resilient return member 40, such as a spring washer, is interposed between the advance gearwheel 15 and the bearing 18. The spring washer 40 bears axially against the inner ring of the bearing 18.

The rotary gearwheel 10 is movable inside the housing 2 along the axis X, and it is urged to move upwards by the spring washer 40 via the advance gearwheel 15 and the bearing 17.

A rolling bearing 50 is interposed axially between the housing 2 and the rotary gearwheel 10, remotely from the advance gearwheel 15. Thus, the rotary gearwheel 10 is urged to bear against the bearing 50 by the spring washer 40.

Figure 4:
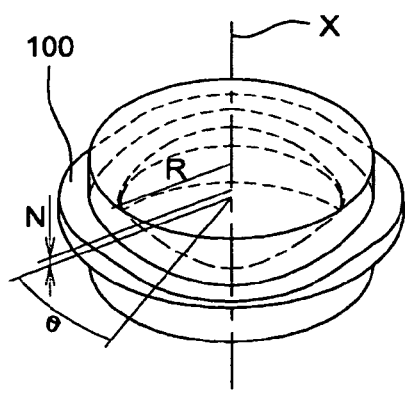
FIG. 4 is a perspective view showing an example of an undulating raceway.

The bearing 50 presents rolling members 51 that, in the example shown, are rollers inserted in a cage 54 and that rotate between a smooth top bearing ring 52 resting against a top rolling bearing 55 for guiding the rotary gearwheel 10, and an undulating bottom ring 53 defining an undulating raceway, resting on a shoulder 88 of the rotary gearwheel 10. An example of an undulating raceway 100 with an axial component is shown in FIG. 4. This figure shows the radius R1 of the ring and the angle θ used in calculating the number of vibratory periods per revolution of the spindle, as described above.

The axis of rotation of each rolling member 51 may be perpendicular to the axis X, as shown.

By way of example, the top bearing 55 is a ball bearing, but it could be some other type of bearing.

The undulating raceway causes the rollers 51 to move axially during their rotation. The extreme amplitude of this axial movement may for example lie in the range 0.2 mm to 0.4 mm. Such axial movement is transmitted via the rotary gearwheel 10 to the advance gearwheel 15, and thus to the tool-carrier spindle 3.

The undulating raceway preferably has an odd number of undulations per revolution, so as to obtain a vibratory frequency that is a non-integer multiple, in particular an irrational multiple, of the frequency of rotation.

The system 5 includes a drive wheel 60 for driving the advance gearwheel 15, which drive wheel is coupled to the wheel 11 by a dog clutch and can be automatically uncoupled from the drive wheel 11 at the end of the downward stroke of the spindle 3 so as to enable the spindle to be raised.

The wheel 60 drives the advance gearwheel 15 at a speed of rotation that is slightly different to the speed of rotation of the rotary gearwheel 10, so as to generate the advance movement desired for the spindle 3 in the advance direction A, in known manner.

At the end of the advance movement of the spindle 3, an abutment 90 carried by the spindle 3 comes to bear against the end edge surface of the rotary gearwheel 10 and causes the drive wheel 60 to move away from the drive wheel 11.

The drive wheel 60 entrains downwards a piston 70 that carries a sealing ring 92. When the drive wheel 60 is coupled to the drive wheel 11, the sealing ring isolates the chamber 72 situated above the piston from a compressed air inlet 94. When the piston 70 is moved downwards, the sealing ring 92 ceases to bear in leaktight manner, and the pressure that exists above the chamber 72 drives the piston 70 downwards. The drive wheels 11 and 60 are then completely uncoupled and the spindle can perform an upward movement. A valve 96 is actuated by the spindle 3 at the end of its upward movement, thereby bringing the chamber 72 to atmospheric pressure and enabling the piston 70 to rise under the effect of a return spring 73. The drive wheels 11 and 60 can couple together once more.

The transmission system may be similar to that described in patent application FR 2 881 366.

Figure 3:
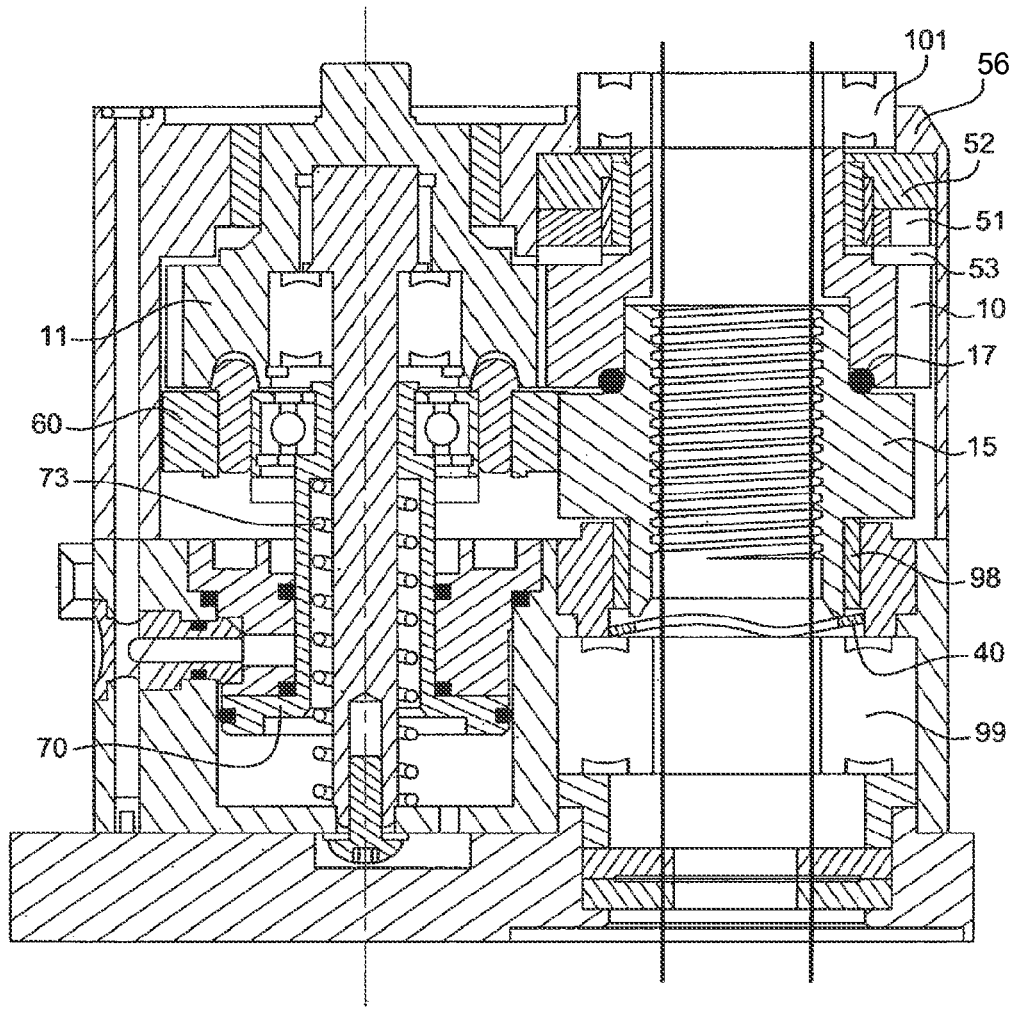
FIG. 3 is a view similar to FIG. 2 showing a variant embodiment.

The variant embodiment shown in FIG. 3 differs from that in FIG. 2 in particular in that the bottom bearing 18 is replaced by a needle bearing 98 that accommodates axial movement between the raceways more easily. The spindle 3 is guided at its bottom end by a bearing 99 having two rows of balls.

A needle bearing 56 is also used to replace the top bearing 55 for guiding rotation of the rotary gearwheel 10.

The top of the spindle 3 is guided in rotation by a ball bearing 101. The spring washer 40 rests against the bottom ring of the bearing 99 having two rows of balls.

Figure 5:
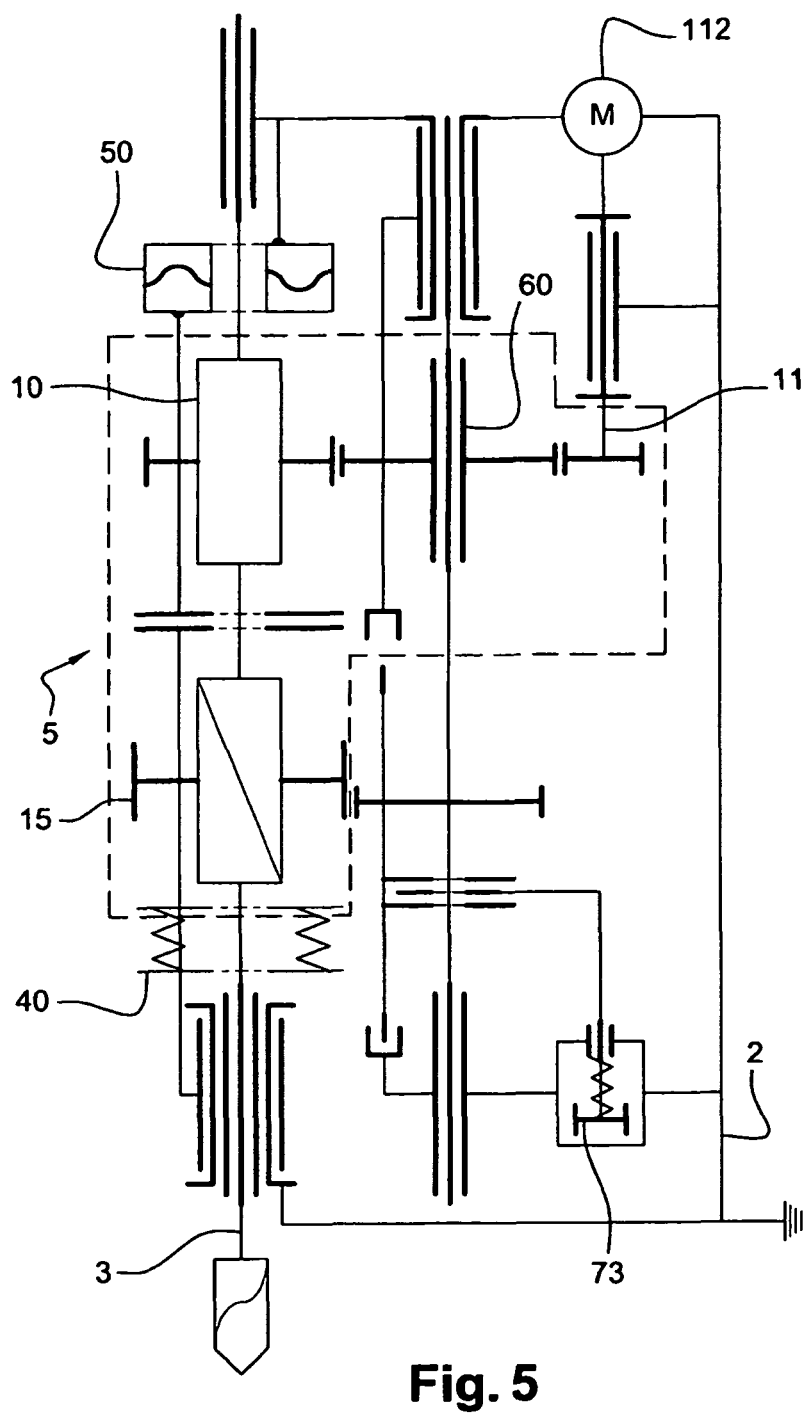
FIG. 5 is a kinematic or skeleton diagram of an example device made in accordance with the invention.

FIG. 5 is a kinematic diagram of an example of a device made in accordance with the invention.

This diagram shows the connections between the main elements of the above-described device. The motor 112 to which the transmission system 5 is coupled by the drive wheel 11 can also be seen.

Figure 6:
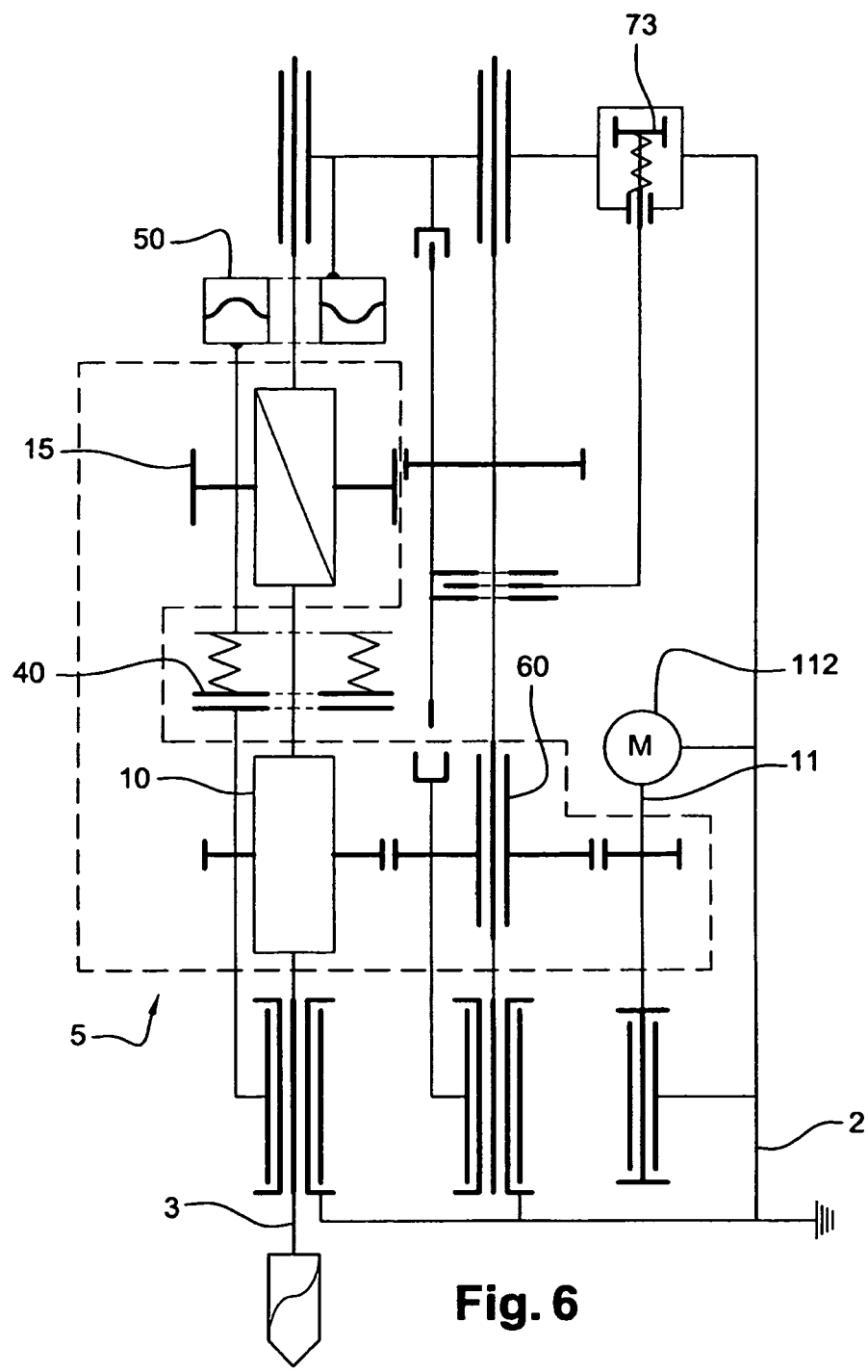
FIGS. 6 and 7 are kinematic diagrams for various embodiments of devices of the invention.
Figure 7:
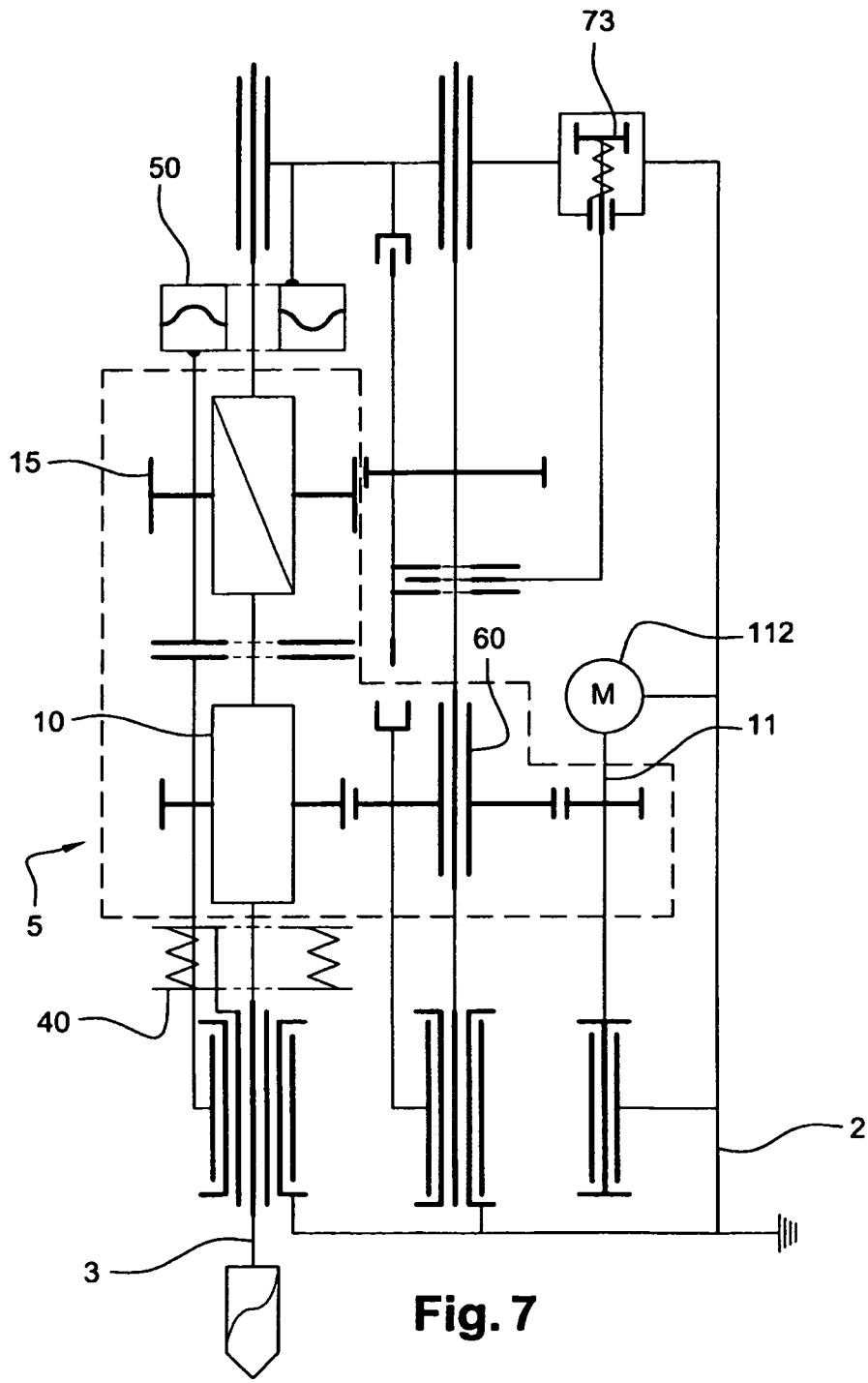

In the variants of FIGS. 6 and 7, the system 5 is integrated in a configuration in which the advance and transmission gearwheels are interchanged. The location of the return means 40 differs between the embodiments of FIGS. 6 and 7.

Naturally, the invention is not limited to the examples shown. In particular it is possible to make the transmission and advance system 5 in other ways.

The term "comprising a" should be understood as being synonymous with "comprising at least one".

What is claimed is:

1. An axial machining device comprising a tool-carrier spindle rotatable in a housing, the housing housing a transmission system causing the spindle to advance automatically relative to the housing under the effect of the tool-carrier spindle being driven in rotation, the transmission system including an advance gearwheel screwed onto the spindle, device including a resilient return member urging the advance gearwheel in a first axial direction opposite to the advance direction of the spindle, and also including a first rolling bearing having rolling members rolling on an undulating raceway having an axial component, thereby periodically urging the advance gearwheel to move in a second direction opposite to the first, such that rotation of the spindle is accompanied by axial vibratory motion, the undulating raceway presenting a non-integer number of vibratory periods per revolution of the tool-carrier spindle.

2. A device according to claim 1, the first rolling bearing having rollers.

3. A device according to claim 1, the undulating raceway producing an irrational number of vibratory periods per revolution of the carrier spindle.

4. A device according to claim 1, the transmission system including a rotary gearwheel serving to drive the tool-carrier spindle in rotation and arranged in the housing with the possibility of moving axially relative thereto.

5. A device according to claim 4, the rotary gearwheel being situated between the advance gearwheel and the first rolling bearing.

6. A device according to claim 4, including a second rolling bearing interposed between the advance gearwheel and the rotary gearwheel.

7. A device according to claim 6, comprising a third rolling bearing, the advance gearwheel rotating within said third rolling bearing.

8. A device according to claim 7, comprising a fourth rolling bearing including a radially inner ring through which the tool-carrier spindle passes, the resilient return member comprising a spring washer having the tool-carrier spindle passing therethrough, the spring washer resting against said radially inner ring of said fourth rolling bearing.

9. A device according to claim 1, the undulating raceway having an odd number of undulations.

10. A method of performing axial machining in a workpiece, wherein use is made of a device as defined in claim 1.

11. A method according to claim 10, applied to countersinking or counterboring operations.

12. A device according to claim 1, the first rolling bearing having a flat ring and an undulating ring with the rolling members rotating between them, the undulating ring defining the undulating raceway, the flat ring or the undulating ring being stationary within the device.

13. A device according to claim 1, the number of vibratory periods per revolution of the tool-carrier spindle lying between 1 and 3.

* * * * *